United States Patent [19]

Taneo

[11] Patent Number: 5,053,746

[45] Date of Patent: Oct. 1, 1991

[54] VEHICULAR COMMUNICATION DEVICE

[76] Inventor: Panfilo C. Taneo, Hillcrest Apt. C-3, Shelbyville, Tenn. 37160

[21] Appl. No.: 519,787

[22] Filed: May 7, 1990

[51] Int. Cl.⁵ .............................................. B60Q 1/50
[52] U.S. Cl. ................................... 340/473; 340/468; 340/480
[58] Field of Search .............. 340/473, 468, 480, 487; 40/591, 592, 556, 477; 116/28 R, 39, 51

[56] References Cited

U.S. PATENT DOCUMENTS

| | | | |
|---|---|---|---|
| 2,620,579 | 12/1952 | Dienes | 40/591 |
| 2,812,605 | 11/1957 | Whaley | 40/591 |
| 3,094,683 | 6/1963 | Watkins | 116/39 |
| 3,678,457 | 7/1972 | Lev | 340/468 |
| 3,787,808 | 1/1974 | Knopf . | |
| 4,112,376 | 9/1978 | Fosnough et al. . | |
| 4,264,979 | 4/1981 | Gutowski . | |
| 4,361,828 | 11/1982 | Hose | 340/468 |
| 4,574,269 | 3/1986 | Miller | 340/468 X |
| 4,607,444 | 8/1986 | Foster | 116/28 R X |
| 4,949,071 | 8/1990 | Hutchison | 340/468 |

Primary Examiner—Donnie L. Crosland
Assistant Examiner—Brian R. Tumm
Attorney, Agent, or Firm—Leon Gilden

[57] ABSTRACT

A vehicular communication device includes a visual display panel comprising a matrix of LED light members operative through a controller and keyboard. The panel is mounted rearwardly of a vehicle forwardly of the trunk lid. The panel includes bracket members for securement of the panel to the vehicular trunk overlying a vehicular bumper. The panel may optionally include hydraulic cylinder to pivot the panel for enhanced visual positioning relative to a rearwardly positioned individual.

1 Claim, 4 Drawing Sheets

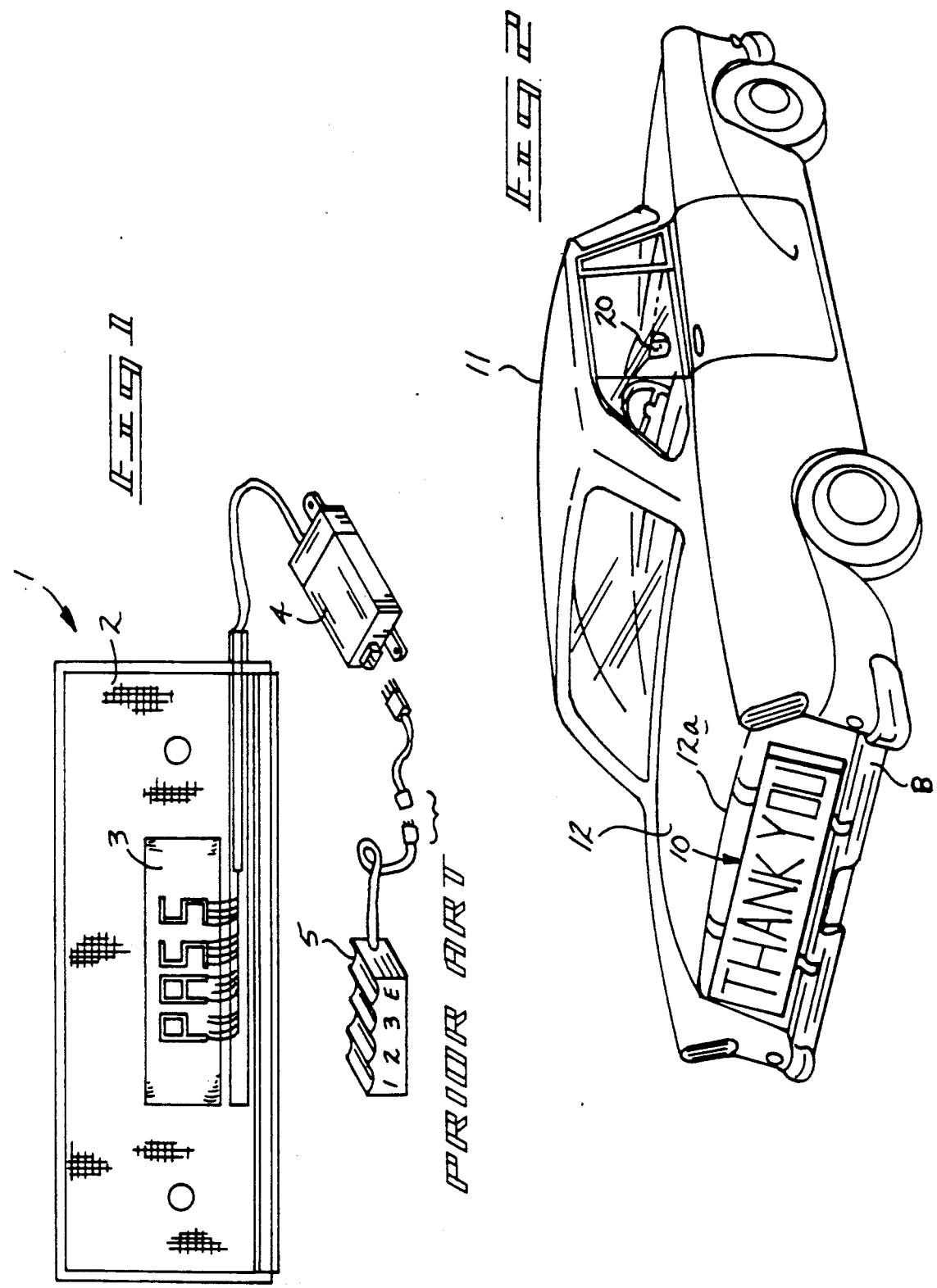

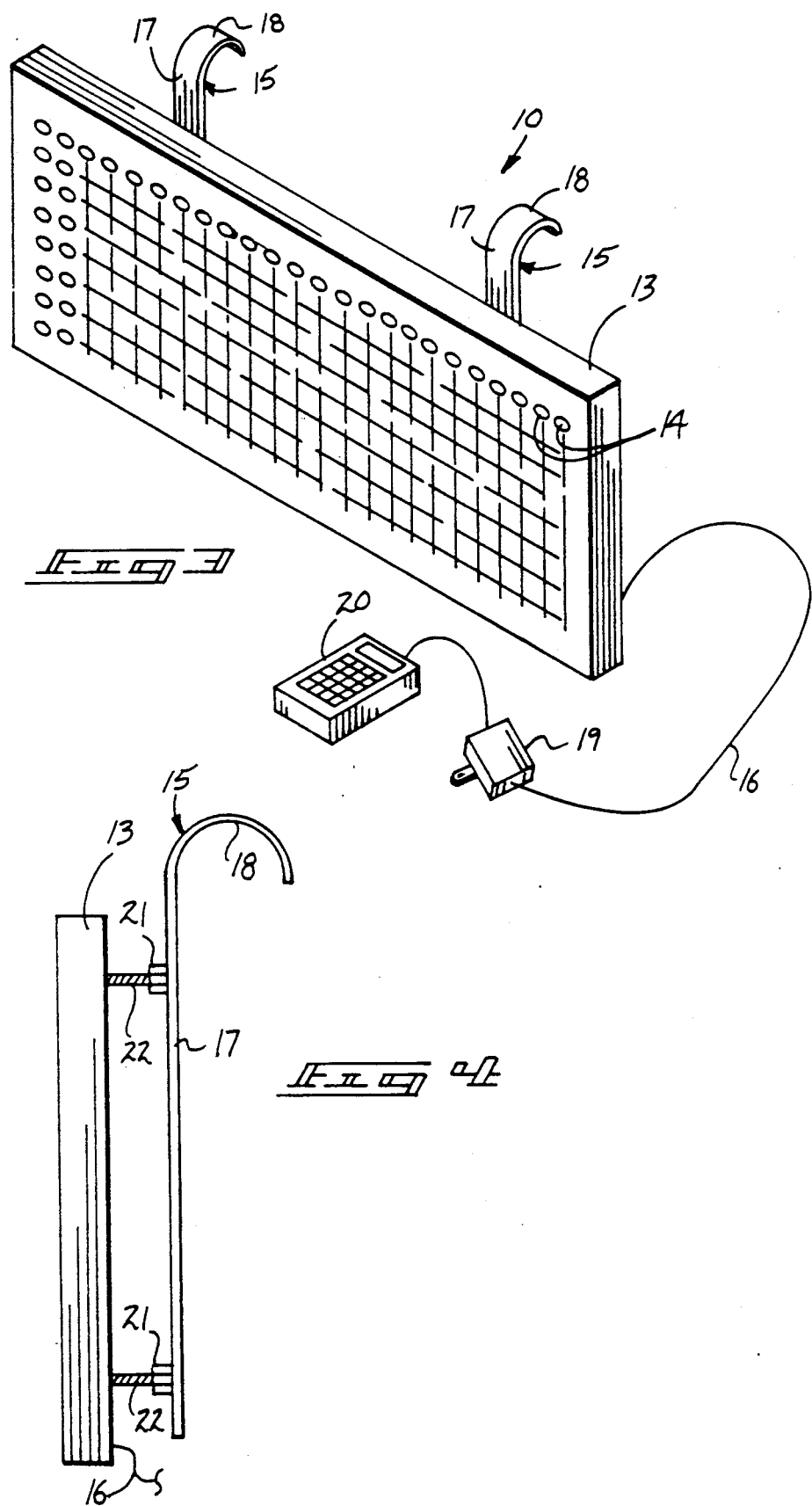

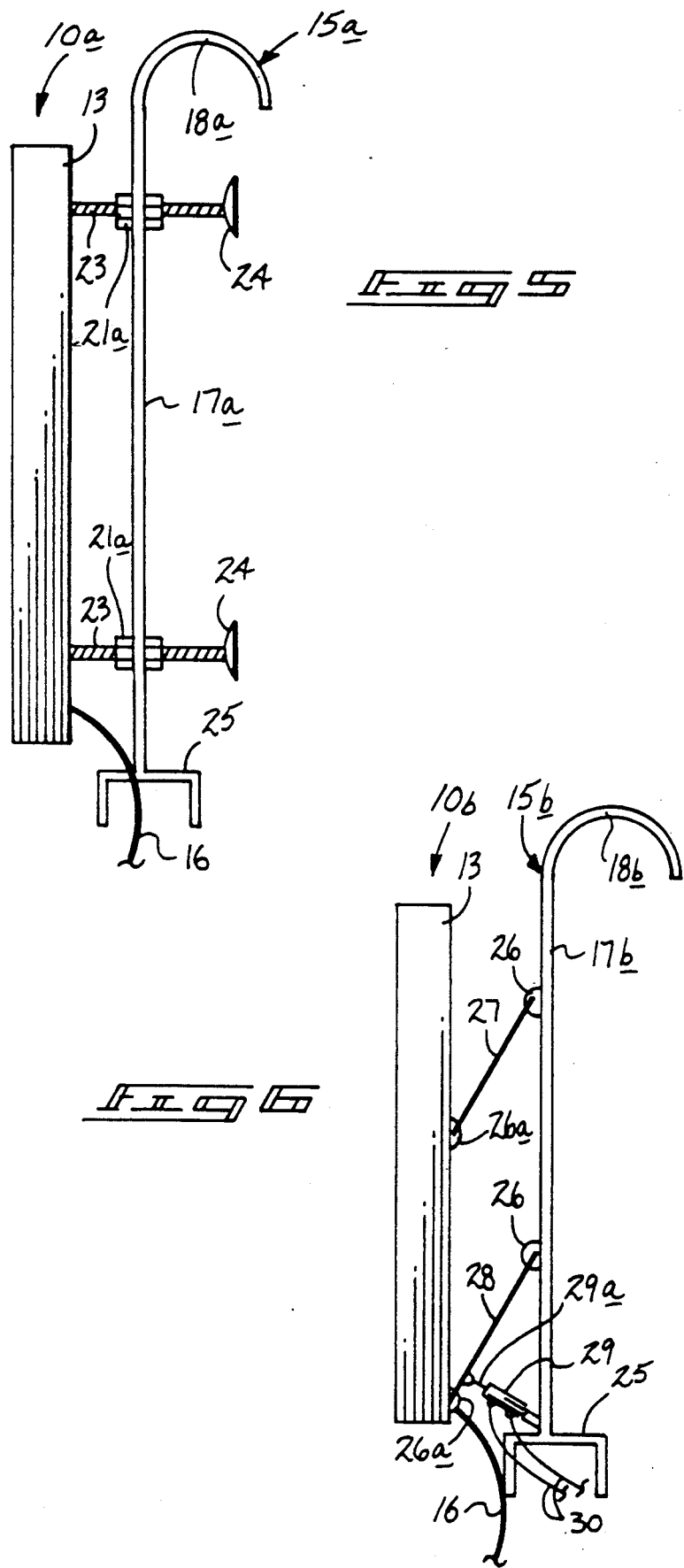

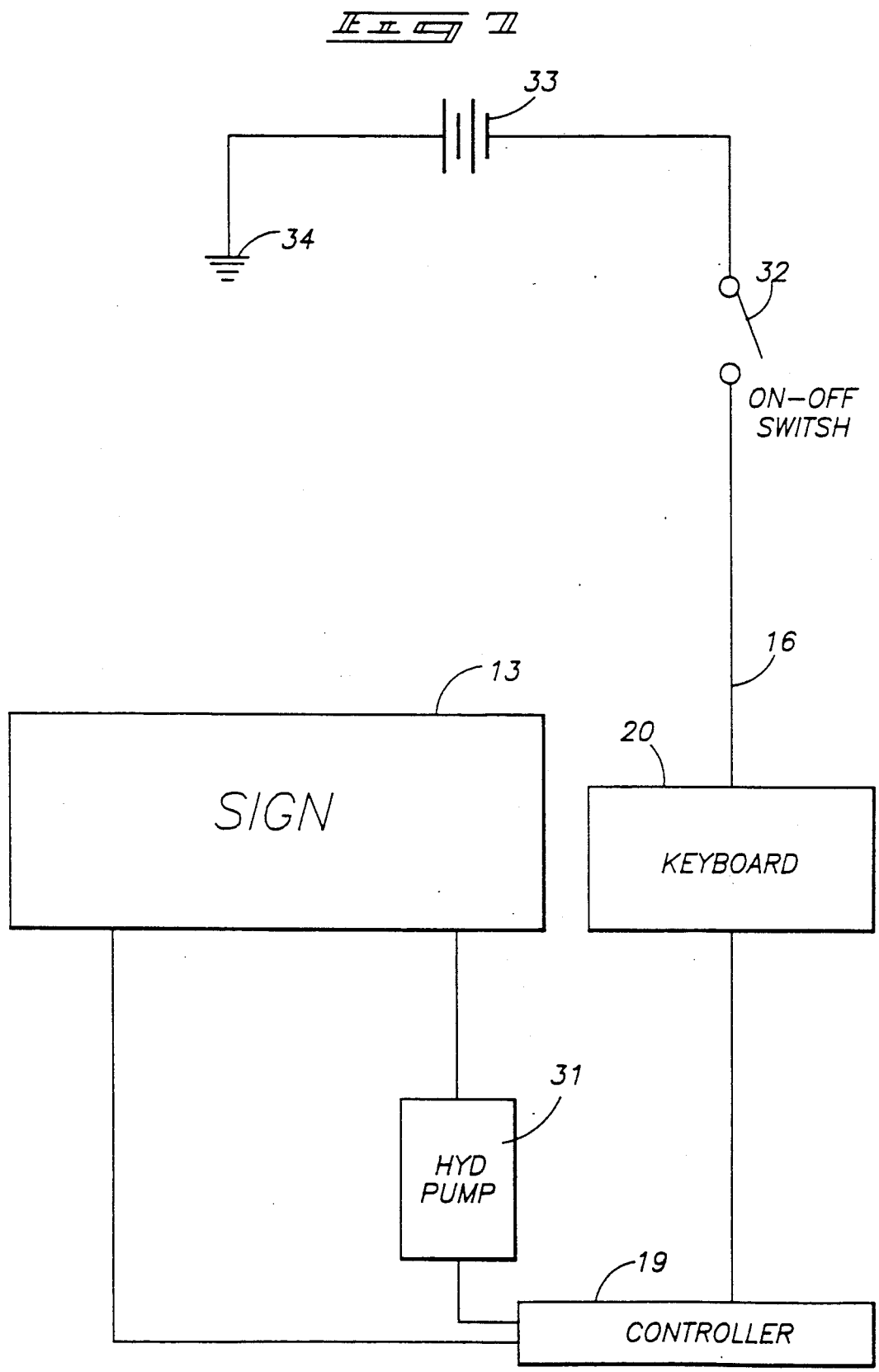

VEHICULAR COMMUNICATION DEVICE

BACKGROUND OF THE INVENTION

1. Field of the Invention

The field of invention relates to vehicular communication devices, and more particularly pertains to a new and improved vehicular communication device wherein the same is selectively securable to a rear portion of an automobile adjacent a trunk assembly for selective communication with a rearwardly oriented spectator.

2. Description of the Prior Art

Vehicular communication devices have heretofore been utilized in the prior art. Such devices have typically been positioned interiorly of the vehicle for communication with associated visual impeding of a vehicular driver's view. Further, securement of such devices has frequently been of a cumbersome and awkward nature. The instant invention attempts to overcome deficiencies of the prior art in providing a display panel readily positioned with associated tilting or orienting means to more readily position a viewing panel relative to a rearwardly positioned observer. Examples of the prior art include U.S. Pat. No. 4,574,269 configured for mounting adjacent a rear window of a vehicle by providing a panel of a semi-transparent nature with light emitting diodes for directing such communication to other vehicles.

U.S. Pat. No. 3,787,808 sets forth a further vehicular communication device for external mounting relative to a vehicle wherein the device is configured for a permanent mounting arrangement relative to the vehicle.

U.S. Pat. No. 4,361,828 to Hose sets forth a vehicle communication device wherein the device is positioned for mounting upon a rear window shelf unit for display of associated messages therefrom.

U.S. Pat. No. 4,264,979 to Gutowski sets forth a display panel in cooperation with a citizen's band communication device wherein the display panel is mounted rearwardly of a rear window of an associated automobile with a typical obstruction of such view through the rear window.

U.S. Pat. No. 4,112,376 to Fosnough, et al., sets forth a digital read-out within a motor vehicle wherein the read-out panel is configured for mounting on a rear window shelf adjacent the rear window in a manner consistent with the prior art.

As such, it may be appreciated that there is a continuing need for a new and improved vehicular communication device wherein the same addresses the problem of selective mounting remote from a rear window and further addresses the problem of visual positioning of the display panel by use of a tilting arrangement.

SUMMARY OF THE INVENTION

In view of the foregoing disadvantages inherent in the known types of vehicle communication devices now present in the prior art, the present invention provides a vehicular communication device wherein the same is configured and arranged for mounting adjacent a vehicular trunk assembly overlying the vehicular rear bumper. As such, the general purpose of the present invention, which will be described subsequently in greater detail, is to provide a new and improved vehicular communication device which has all the advantages of the prior art vehicle communication devices and none of the disadvantages.

To attain this, the present invention includes a display panel utilizing light emitting diode indicator lights positioned in a matrix throughout the panel wherein the display panel indicates a message through the use of a keyboard and display panel controller. The display panel includes bracketry for securement of the panel in a selective manner overlying the rear bumper and trunk assembly of an associated self-propelled vehicle. The brackets include hook members at both ends of strap means secured to the panel with spacer rods adjustably mounted relative to the brackets to position the panel relative to the rear trunk assembly. Optionally, a hydraulic pump may be utilized in cooperation with links pivotally securing the panel to the brackets for effecting tilting and visual enhancement of the panel relative to the brackets and vehicle.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved vehicular communication device which has all the advantages of the prior art vehicle communication devices and none of the disadvantages.

It is another object of the present invention to provide a new and improved vehicular communication device which may be easily and efficiently manufactured and marketed.

It is a further object of the present invention to provide a new and improved vehicular communication device which is of a durable and reliable construction.

An even further object of the present invention is to provide a new and improved vehicular communication device which is susceptible of a low cost of manufacture with regard to both materials and labor, and which accordingly is then susceptible of low prices of sale to the consuming public, thereby making such vehicular communication devices economically available to the buying public.

Still yet another object of the present invention is to provide a new and improved vehicular communication device which provides in the apparatuses and methods of the prior art some of the advantages thereof, while simultaneously overcoming some of the disadvantages normally associated therewith.

Still another object of the present invention is to provide a new and improved vehicular communication device wherein the same includes tilting means for visual tilting and directing of the display panel relative to observers.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of a prior art device.

FIG. 2 is an isometric illustration of the instant invention secured and associated with a self-propelled motor vehicle.

FIG. 3 is an isometric illustration of the instant invention and its components.

FIG. 4 is an side view taken in elevation of the instant invention.

FIG. 5 is an side view of the instant invention utilizing modified bracket means.

FIG. 6 is an side view taken in elevation of the instant invention in association with further modified bracketry.

FIG. 7 is a diagrammatic illustration of the control circuit of the instant invention.

DESCRIPTION OF THE PREFERRED EMBODIMENT

With reference now to the drawings, and in particular to FIGS. 1 to 7 thereof, a new and improved vehicular communication device embodying the principles and concepts of the present invention and generally designated by the reference numerals 10, 10a, and 10b will be described.

More specifically, the vehicular communication device 10 provides an improvement over a typical prior art vehicular communication arrangement 1 wherein a semi-transparent viewer 2 includes a light emitting diode message display unit 3 for mounting on a rear shelf of an automobile adjacent the rear window. Typically, a control unit 4 and key pad 5 are utilized to direct predetermined messages to the display unit.

The vehicular communication device 10, as illustrated in FIG. 2, secured in its desired position relative to a vehicle 11 positioned forwardly of a trunk lid assembly 12 about the forward edge 12a of the trunk lid assembly overlying the rear bumper "B". The device includes a visual display panel 13 that includes a matrix of light emitting diodes (LED) 14 for directing a predetermined message on the display panel 13. A control line 16 is associated with a panel control unit 19 and a panel keyboard unit 20 to effect directing of a predetermined message to the panel, wherein the panel keyboard unit 20 is typically mounted onto the vehicular dashboard, as illustrated in FIG. 2. The display panel 13 may direct alphanumeric messages thereby as the control unit 19 is pre-programmed to selectively energize the light emitting diodes 14 in any of a preselected number of patterns directed through the associated keyboard unit 20.

The display panel 13 is mounted to the vehicle by use of a plurality of spaced clamp assemblies 15 positioned rearwardly and directed above the display panel for securement to the forward edge 12a of the trunk lid assembly 12. The clamp assemblies 15 each include an elongate strap 17 directed orthogonally relative to the longitudinal orientation of the display panel 13 with a rearwardly directed hook 18 integrally and continuously formed to the upper portion of each elongate strap 17. Spaced internally threaded nut members 21 are integrally secured to forward surfaces of the elongate straps 17 with a plurality of such nut members mounted to each of the straps of each clamp assembly 15. A threaded boss 22 rotatably mounted and directed orthogonally relative to rear a surface of the display panel 13 is rotatably mounted and secured to each pair of nut members 21 to selectively space the display panel 13 relative to the strap members and the vehicular trunk lid assembly 12.

FIG. 5 illustrates a modified communication device 10a wherein the modified clamp assemblies 15a each include an addition to the elongate strap 17a and the rearwardly extending hook 18a, a downwardly positioned and oriented "U" shaped bracket 25 to overlie the associated bumper "B" to enhance positioning of the display panel 13. Furthermore, elongate threaded bosses 23 extend through associated threaded nut members 21a and through the associated clamp assemblies 15a and terminate at their rearwardmost ends in a resilient suction tip 24 for positioning against a rear surface of the vehicle underlying the trunk lid assembly 12.

FIG. 6 is illustrative of a further modified vehicular communication device 10b wherein the display panel 13 is pivotally mounted to the associated clamp assemblies 15b. The elongate strap 17b of each clamp assembly includes the rearwardly directed hook 18b and the downwardly oriented "U" shaped bracket 25. Additionally, a first pair of forwardly directed ears 26 are integrally mounted to a forward surface of each elongate strap 17b and cooperate with second ears 26a mounted onto the rear surface of the display panel 13. Upper and lower links 27 and 28 respectively are pivotally mounted at each of their ends to the respective first and second ears 26 and 26a to enable pivotment of the display panel 13 relative to each clamp assembly 15. The lower link 28 includes a hydraulic piston 29a pivotally mounted thereto and reciprocatably received within a hydraulic cylinder 29. The hydraulic cylinder 29 is operative through hydraulic lines 30 to effect reciprocation of the piston 29a relative to the cylinder 29 and effect selective reciprocation of the display panel 13 relative to the clamp assemblies 15b. It is understood that the clamp assemblies 15a and 15b are at a spaced relationship in a manner as set forth in FIGS. 2 and 3 relative to the display panel 13.

FIG. 7 illustrates diagrammatically the control circuit wherein a hydraulic pump 31 is operative to selectively reposition and pivot the display panel relative to the vehicle 11 and is controlled through the controller 19 which in turn is directed by the keyboard 20 to selectively actuate the hydraulic pump 31, as well as directing a message to the display panel 13. An on/off switch 32 is positioned as desired within the electrical control line 16 and is operative to direct current from the battery 33 which maybe the vehicular battery that is in turn grounded through a ground cable 34 to the vehicle itself.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A vehicular display device for securement to a self-propelled vehicle to overlie the vehicle rear bumper and mounted forwardly of the forward edge of a trunk assembly of the vehicle, the device comprising, in combination, a display panel including a plurality of light members arranged in a matrix over a forward surface of the panel, the light members selectively illuminated by a display panel control unit, the display panel control unit operative through a keyboard unit to select a message pattern and direct the control unit to selectively illuminate said light members to form said message pattern on the forward surface of the display panel, a plurality of spaced bracket assemblies mounted to the rear surface of the display panel and extending rearwardly thereof to secure the display panel to the vehicle, wherein each of the bracket assemblies comprises an elongate strap mounted orthogonally relative to a longitudinal axis of the display panel, the elongate strap terminating in a rearwardly extending hook at an upper portion of each said elongate strap, wherein each said elongate strap includes a "U" shaped bracket member directed downwardly and integrally mounted to a lowermost portion of each said elongate strap for overlying the bumper of the self-propelled vehicle, a plurality of first ears integrally mounted to a forward surface of each said elongate strap, the first ears including a first upper ear and a first lower ear, and a plurality of second ears integrally and orthogonally mounted to a rear surface of the display panel the second ears including a second upper ear and a second lower ear, and an upper link pivotally mounted to the first upper ear and the second upper ear, and a lower link pivotally mounted to the first lower ear and the second lower ear, and a hydraulic cylinder mounted adjacent to each said "U" shaped bracket and including a piston reciprocatably mounted within each said hydraulic cylinder, the piston piviotally mounted to the lower link, and hydraulic lines secured and directed from the hydraulic cylinder to a hydraulic pump, the hydraulic pump operably associated with the display panel control unit to selectively reposition the display panel relative to each of said bracket member assemblies.

* * * * *